United States Patent [19]
Sedy

[11] Patent Number: 5,556,111
[45] Date of Patent: Sep. 17, 1996

[54] FACE SEAL WITH ANGLED GROOVES AND SHALLOW ANNULAR GROOVE

[75] Inventor: Josef Sedy, Mount Prospect, Ill.

[73] Assignee: Durametallic Corporation, Kalamazoo, Mich.

[21] Appl. No.: 445,428

[22] Filed: May 19, 1995

Related U.S. Application Data

[63] Continuation of Ser. No. 115,153, Sep. 1, 1993, abandoned, and a continuation of Ser. No. 115,154, Sep. 1, 1993, abandoned.

[51] Int. Cl.$^6$ ..................................................... F16J 15/34
[52] U.S. Cl. .................................... 277/96.1; 277/81 R
[58] Field of Search .................... 277/96.1, 96, 81 R, 277/82, 83, 91

[56] References Cited

U.S. PATENT DOCUMENTS

| | | |
|---|---|---|
| 3,033,577 | 5/1962 | Spiess . |
| 3,109,658 | 11/1963 | Barrett et al. . |
| 3,499,653 | 3/1970 | Gardner . |
| 3,527,465 | 9/1970 | Guinard . |
| 3,675,935 | 7/1972 | Ludwig et al. . |
| 3,744,805 | 7/1973 | Heinrich . |
| 3,751,045 | 8/1973 | Lindebaum . |
| 3,782,737 | 1/1974 | Ludwig et al. . |
| 3,804,424 | 4/1974 | Gardner . |
| 3,894,741 | 7/1975 | McHugh . |
| 4,212,475 | 7/1980 | Sedy . |
| 4,406,466 | 9/1983 | Geary, Jr. . |
| 4,426,087 | 1/1984 | Sargent et al. . |
| 4,523,764 | 6/1985 | Albers et al. . |
| 4,889,348 | 12/1989 | Amundson et al. . |
| 5,066,026 | 11/1991 | Heck et al. . |
| 5,090,712 | 2/1992 | Pecht et al. . |
| 5,092,612 | 3/1992 | Victor et al. . |
| 5,133,562 | 7/1992 | Lipschitz . |
| 5,137,284 | 8/1992 | Holder . |
| 5,143,384 | 9/1992 | Lipschitz . |
| 5,169,159 | 12/1992 | Pope et al. . |
| 5,174,584 | 12/1992 | Lahrman . |
| 5,180,173 | 1/1993 | Kimura et al. . |
| 5,201,531 | 4/1993 | Lai . |
| 5,222,743 | 6/1993 | Goldswain et al. . |
| 5,224,714 | 7/1993 | Kimura et al. . |

FOREIGN PATENT DOCUMENTS

| | | |
|---|---|---|
| 0297381 | 1/1989 | European Pat. Off. . |
| 0298324 | 1/1989 | European Pat. Off. . |
| 0369295 | 5/1990 | European Pat. Off. . |
| 1964150 | 7/1970 | Germany . |
| 3901362 | 7/1990 | Germany . |
| 4337164 | 11/1992 | Japan . |
| 1719756 | 3/1992 | U.S.S.R. . |
| 920892 | 3/1963 | United Kingdom . |

*Primary Examiner*—Daniel G. DePumpo
*Attorney, Agent, or Firm*—Flynn, Thiel, Boutell & Tanis, P.C.

[57] ABSTRACT

A non-contacting grooved face seal for a shaft rotating at a high pressure and high speed with a combination of two groove patterns on one of the two sealing faces of mating sealing rings; one pattern being relatively deep angled grooves, and the other pattern begin a relatively shallow annular groove. The relatively deep groove pattern is optimized for hydrodynamic operation and on shaft rotation pumps the sealed fluid between the sealing faces to set the running clearance. The relatively shallow pattern is designed to hydrostatically prevent a friction lock of the sealing faces at starting and stopping of shaft rotation by admitting controlled amount of sealed fluid between the sealing faces when the shaft is at or near to a stationary condition.

7 Claims, 7 Drawing Sheets

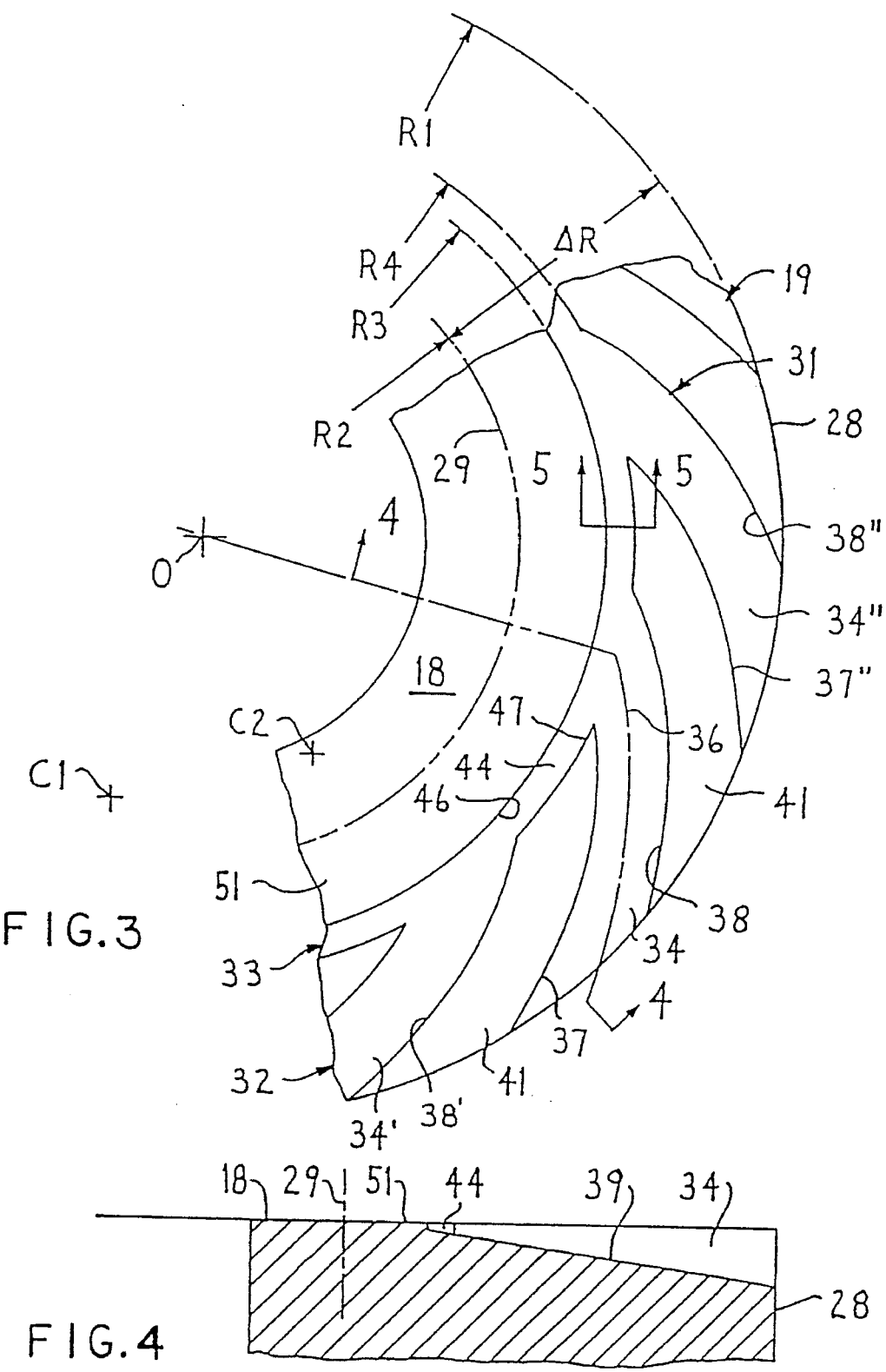
FIG.3
FIG.4
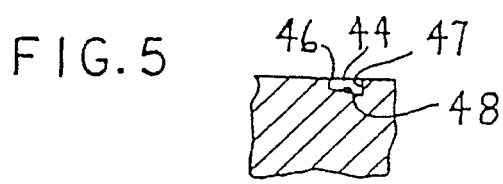
FIG.5

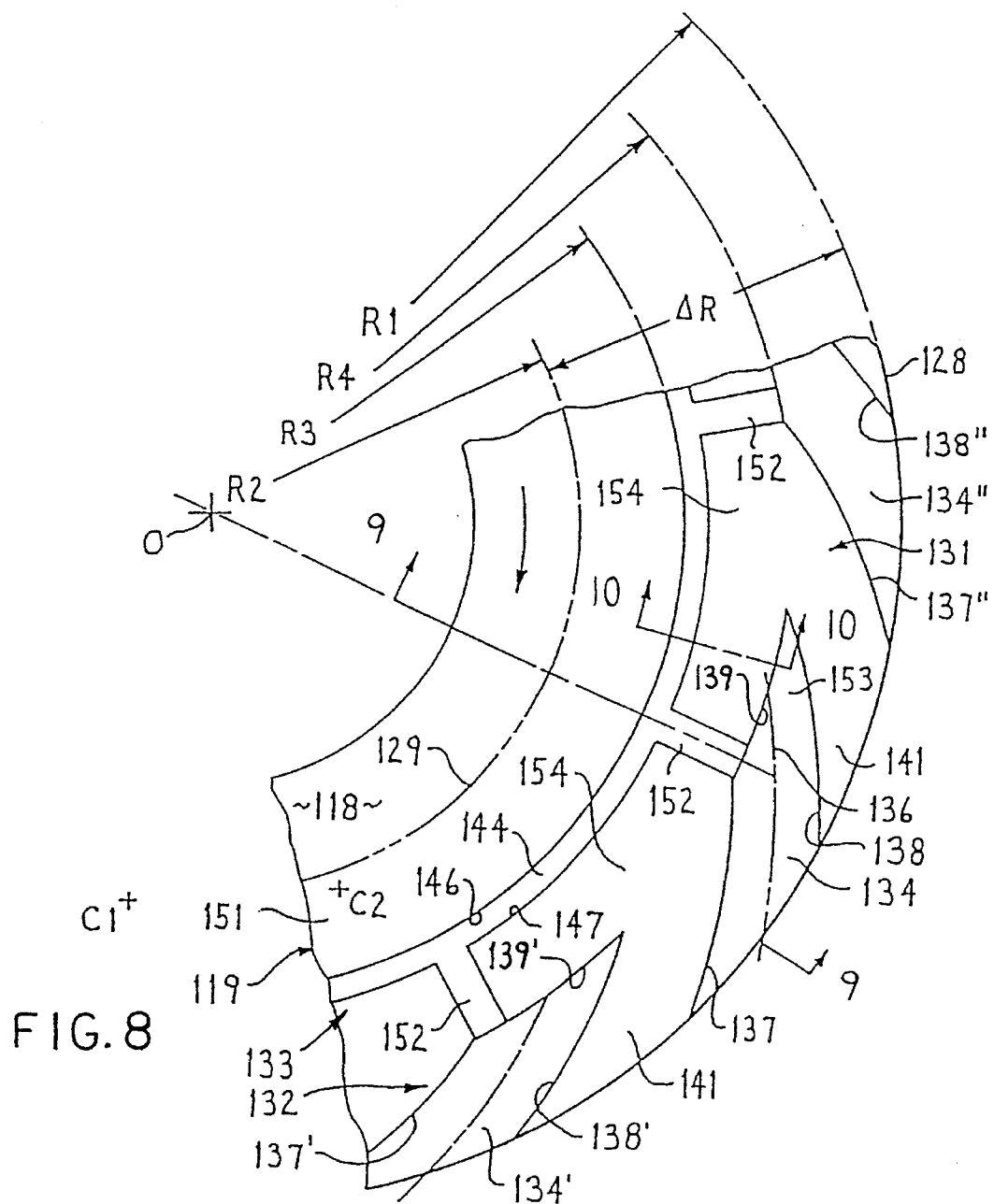
FIG. 8
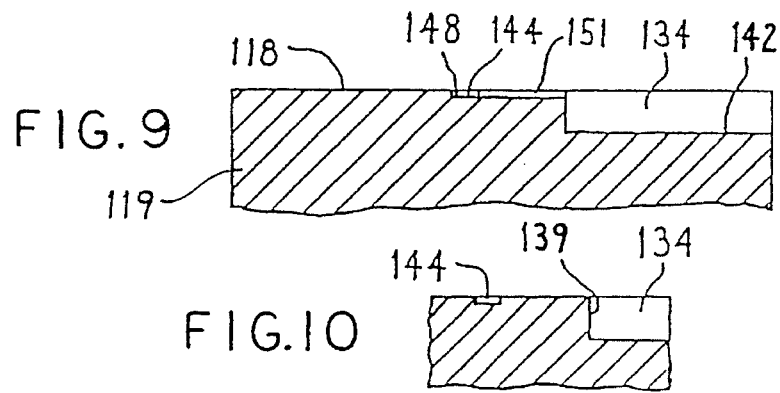
FIG. 9
FIG. 10

FACE SEAL WITH ANGLED GROOVES AND SHALLOW ANNULAR GROOVE

CROSS REFERENCE TO RELATED APPLICATION

This is a continuation and a consolidation of my application Ser. Nos. 08/115,153 now abandoned and 08/115,154, now abandoned both filed Sep. 1, 1993.

FIELD OF THE INVENTION

This invention relates to sealing devices for rotating shafts, wherein a sealed fluid is employed to generate hydrostatic-hydrodynamic or aerostatic-aerodynamic forces between opposed interacting face-type sealing elements, one stationary and the other rotating. These forces provide for slight separation and non-contacting operation of the sealing elements, thereby minimizing face wear and friction power losses while maintaining low fluid leakage.

BACKGROUND OF THE INVENTION

Rotary fluid film face seals, also called gap or non-contacting face seals, are usually applied to high-speed and/or high-pressure rotating equipment wherein the use of ordinary mechanical face seals with face contact would result in excessive heat generation and wear. Non-contacting operation avoids this undesirable face contact at times when the shaft is rotating above a certain minimum speed, which is called a lift-off speed.

There are various ways of accomplishing the above non-contacting operation. One of the more commonly used ways includes the formation of a shallow spiral groove pattern in one of the sealing faces. The sealing face opposite the grooved face is relatively flat and smooth. The face area where these two sealing faces define a sealing clearance is called the sealing interface.

The above-mentioned spiral groove pattern on one of the sealing faces normally extends inward from the outer circumference and ends at a particular face diameter called the groove diameter, which is larger then the inner diameter of the seal interface. The non-grooved area between the groove diameter and the inner interface diameter serves as a restriction to fluid outflow. Fluid delivered by the spiral pattern must pass through this restriction and it can do so only if the sealing faces separate. The way this works is through pressure build-up. Should the faces remain in contact, fluid will be compressed just ahead of the restriction, thus building up pressure. The pressure causes separation force which eventually becomes larger than the forces that hold the faces together. In that moment the sealing faces separate and allow the fluid to escape. During operation of the seal, an equilibrium establishes itself between fluid inflow through spiral pumping and fluid outflow through face separation. Face separation is therefore present as long as the seal is operating, which means as long as one face is rotating in relation to the opposite face.

However, spiral pumping is not the only factor that determines the amount of the separation between the sealing faces. Just as the spirals are able to drive the fluid into the non-groove portion of the sealing interface past the groove diameter, so can the pressure differential. If enough of a pressure difference exists between the grooved end of the interface and the non-grooved end, fluid will also be forced into the non-grooved portion of the interface, thereby separating the faces and forming the clearance.

Both ways in which clearance can be formed between the sealing faces, one with speed of rotation, the other with pressure differential, are distinct and separate, even though the effects of both combine on the operating seal. If there is no pressure difference and the seal face separation occurs strictly due to face rotation, forces due to fluid flow are known as hydrodynamic forces if the fluid sealed is a liquid, and aerodynamic forces if the fluid sealed is a gas.

On the other hand, if there is no mutual rotation between the two sealing faces and face separation is strictly the consequence of pressure differential between both ends of the sealing interface, forces due to fluid flow are called hydrostatic forces if the fluid sealed is a liquid, and aerostatics forces if the fluid sealed is a gas. In the following, the terms hydrostatic and hydrodynamic are used for both liquid and gas effects since these latter terms are more conventionally used when describing both liquid and gas seals.

A typical spiral groove seal needs to provide acceptable performance in terms of leakage and the absence of face contact during all regimes of seal operation. It must do so not only at top speed and pressure, but also at standstill, at start-up, acceleration, at periods of equipment warm-up or at shutdown. At normal operating conditions, pressure and speed vary constantly, which results in continuous adjustments to the running clearance. These adjustments are automatic; one of the key properties of spiral groove seals is their self-adjustment capability. On change in speed or pressure, the face clearance adjusts automatically to a new set of conditions. Hydrostatic and hydrodynamic forces cause this adjustment.

The operating envelope of speeds and pressures is usually very wide and a seal design of necessity must be a compromise. For its performance to be acceptable at near-zero speed or pressure, it is less than optimum at operating speed and pressure. This is simply due to the fact that, both in terms of pressure and speed, the seal has to be brought up to operating conditions from zero speed and zero pressure differential.

Especially critical to seal operation is the start-up. If the seal is applied to a centrifugal gas compressor, the full suction pressure differential is often imposed onto the seal before the shaft starts turning. This presents a danger in that the sealing faces will lock together with friction. Face lock results when the hydrostatic force is insufficient to counter pressure forces that maintain the seal faces in contact. Face lock can lead to seal destruction, in which excessive breakaway friction between contacting seal faces can cause heavy wear or breakage of internal seal components.

First then, spiral grooves must be able to separate the sealing faces hydrodynamically for full speed non-contacting operation. This normally requires fairly short and relatively deep spiral grooves. Second, the spiral grooves must be able to unload the sealing faces hydrostatically for start/stops to prevent face lock. For this, the grooves have to be extended in length. The extended grooves in turn cause more separation and leakage during full speed operation. The full speed leakage of a typical 3.75 inch shaft seal with short and relatively deep spirals may be about 0.9 SCFM (i.e. Standard Cubic Feet per Minute) at 1,000 psig and 10,000 rpm. However, full speed leakage for such a seal with extended grooves may reach 2.4 SCFM under the same conditions, almost triple the previous value. The constant burden of larger-than-necessary leakage represent significant operating costs and is highly undesirable.

Spiral groove design practice goes back to U.S. Pat. No. 3,109,658 wherein two opposing spiral grooves pump oil against each other to develop a liquid barrier capable of sealing a gas. Such an arrangement is limited in pressure as well as speed capability, as is inherent in the use of liquid forces to seal gas.

Another known arrangement is shown in U.S. Pat. No. 3,499,653. This interface design with partial spiral grooves relies heavily on hydrostatic effects. The interface gap is designed with a tapered shape which is narrower at the non-grooved end and wider at the spiral grooves. The effect of the spiral grooves and therefore the hydrodynamic forces are suppressed since spiral groove pumping becomes less effective across the wider gaps. This likewise affects the stability of the seal and limits its top pressure and speed capability.

A further known arrangement is shown by U.S. Pat. No. 4,212,475. Here the spiral groove itself attempts to act both as a hydrostatic as well as a hydrodynamic pattern and is used to eliminate the need for the tapered shape of the gap so that a considerable degree of spiral groove hydrodynamic force can be applied to impart a self-aligning property to the sealing interface. The self-aligning property forces the sealing interface back towards a parallel position, regardless of whether deviations from parallel position during seal operation occur in radial or tangential directions. This resulted in improvement stability and increased performance limits in terms of pressure and speed.

While the known fluid seals as briefly summarized above have attempted to provide both hydrodynamic and hydrostatic sealing properties, nevertheless the known seals have been deficient with respect to their ability to optimize the combination of these hydrostatic and hydrodynamic properties so as to provide desirable hydrostatic properties which facilitate starting and stopping of seals while effectively minimizing or avoiding direct face contact and minimizing face loading between the seals so that the assembly can be started up with minimal friction to avoid severe frictional power requirements and direct frictional wear between the faces, and at the same time provide desirable hydrodynamic properties between the relatively-rotatable seal faces under a wide range of operating conditions particularly those involving high speed and high pressure.

Accordingly, it is an object of this invention to provide an improved fluid seal of the type employing a grooved pattern on one of the opposed seal faces, which improved seal provides a more optimized combination of hydrodynamic and hydrostatic sealing characteristics so as to permit improved seal performance under a significantly greater range of operating conditions, including operating conditions ranging from start-up to conditions involving high speed and high pressure.

In the improved seal arrangement of the present invention, the groove pattern (which is typically defined on only one of the seal faces) includes first and second groove arrangements both of which communicate with the high pressure fluid at one side of the seal, one groove arrangement being significantly deeper than the other, whereby the deeper arrangement is particularly effective for providing the desired hydrodynamic characteristics, whereas the shallower groove arrangement primarily provides only hydrostatic characteristics. At the same time, these arrangements are positioned such that the shallower arrangement is interposed generally radially between the deeper groove arrangement and a non-grooved annular land or dam which effectively separates the groove pattern from the low pressure side of the seal, whereby desirable hydrostatic and hydrodynamic seal properties can both be obtained but at the same time leakage of sealing fluid (for example, a gas) across the dam to the low pressure side is minimized so as to improve the performance efficiency of the seal.

In the improved seal of this invention, as briefly discussed above, the groove pattern includes the deep groove arrangement which is defined by a circumferentially arranged series of grooves which angle circumferentially and radially inwardly from the surrounding high-pressure side of the seal, which angled grooves may be of spiral, circular or straight configuration. These angled grooves are relatively deep and project only partway across the seal face. In the preferred embodiment, the radially inner ends of the angled grooves communicate with the shallow groove arrangement which is positioned radially inwardly of the deep groove arrangement, but which is separated from the low pressure side of the seal by the intermediate non-grooved annular land or dam. This shallow groove arrangement has a depth which is a small fraction of the depth of the deeper groove arrangement and is effective for creating a hydrostatic force between the opposed sealing faces substantially in the central region thereof as defined between the radially outer and inner boundaries of the seal interface.

In addition, this optimization of the seal properties and performance characteristics is further improved by optimizing the groove pattern or configuration relative to the surrounding lands defined on the seal face so that the fluid film which is created between the opposed seal faces provides a more uniform pressure distribution and sealing characteristics while minimizing distortion of the seal face, which in turn assists in optimizing the seal performance with minimum width of gap between the opposed seal faces while still avoiding or minimizing direct contact and frictional wear between the opposed seal faces.

Further improvement to the seal arrangement is aimed at reduction and elimination of seal face distortions that normally occur as a result of circumferential non-uniformity of hydrostatic pressure fields as these form above groove and land regions at conditions at or near to the zero speed of rotation. This improvement is achieved in the shallow groove arrangement by a narrow and shallow circumferential groove disposed radially adjacent the radially inner ends of the angled grooves. The shallow circumferential groove is in continuous pressure fluid communication with the angled grooves and acts to equalize hydrostatic pressure field non-uniformities circumferentially, as a result suppressing any face distortions and producing a uniform face separation with no or only minimal face-to-face contact even at extremely low magnitudes of separation between the faces.

Other objects and purposes of the invention will be apparent to persons familiar with seals of this general type upon reading the following specification and inspecting the accompanying drawings.

BRIEF DESCRIPTION OF THE DRAWINGS

FIG. 3 is a fragmentary enlargement of a part of FIG. 2 so as to illustrate the groove pattern in greater detail.

FIGS. 4 and 5 are fragmentary sectional views taken substantially along lines 4—4 and 5—5, respectively, in FIG. 3.

FIG. 8 is a fragmentary enlargement of a part of FIG. 7 so as to illustrate the groove pattern in greater detail.

FIGS. 9 and 10 are fragmentary sectional views taken substantially along lines 9—9 and 10—10, respectively, in FIG. 8.

Figure 1:
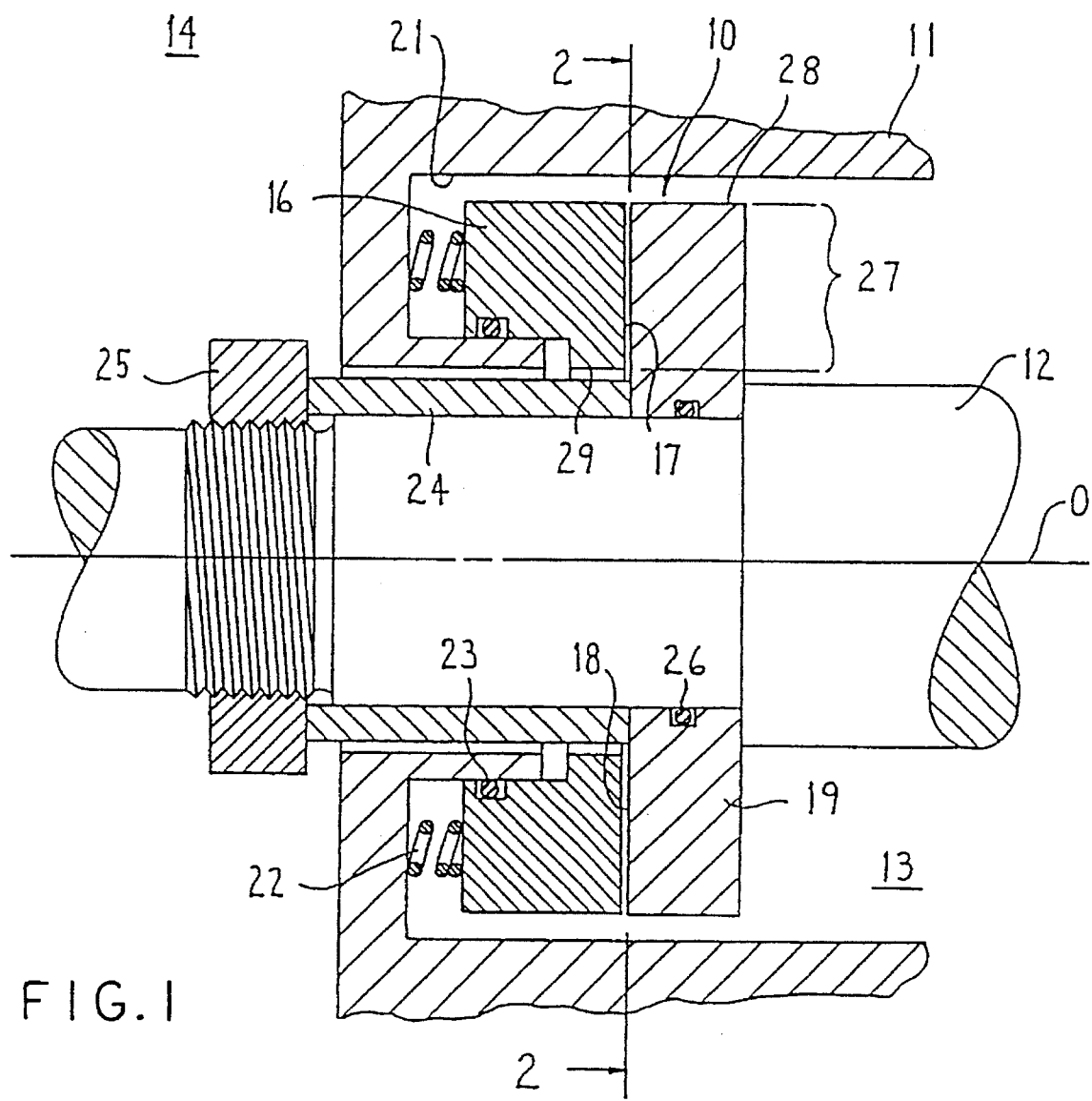
FIG. 1 is a fragmentary central sectional view illustrating a generally conventional fluid face seal arrangement, such as a grooved face seal, associated with a rotating shaft.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the assembly and designated parts thereof. Said terminology will include the words specifically mentioned, derivatives thereof, and words of similar import.

DETAILED DESCRIPTION

Figure 2:
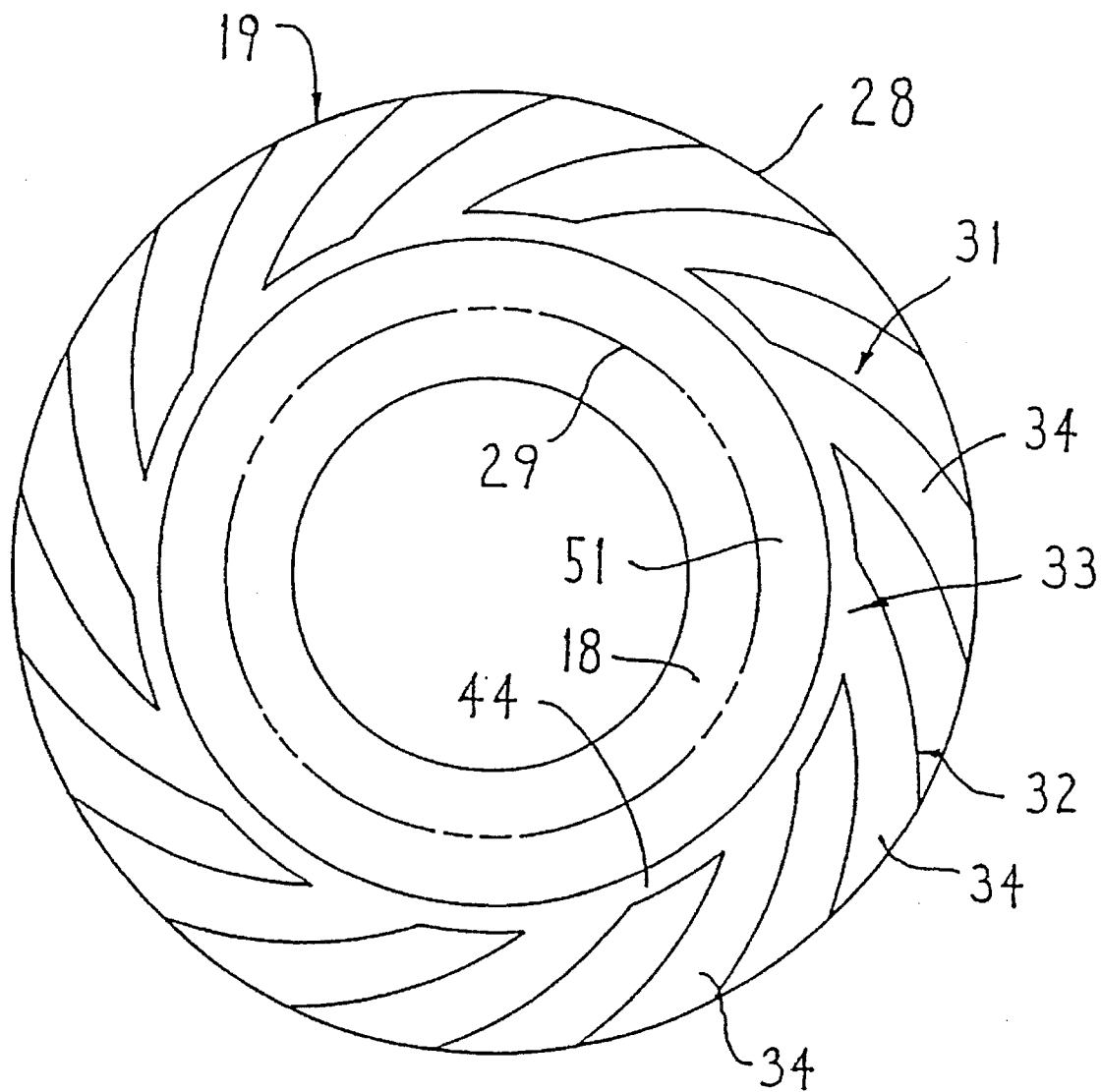
FIG. 2 is a view taken generally along line 2—2 in FIG. 1 and illustrating the groove pattern associated with a face of the rotating seal ring according to an embodiment of this invention.

Referring to FIG. 1, there is shown a typical grooved face seal assembly 10 and its environment. This environment comprises a housing 11 and a rotatable shaft 12 extending through said housing. The seal assembly 10 is applied to seal a fluid (such as a pressurized gas) within the annular space 13 and to restrict its escape into the environment at 14. Basic components of the seal assembly includes an annular, axially movable but non-rotatable sealing ring 16 having a radially extending flat face 17 in opposed sealing relationship with a radially extending flat face 18 of an annular rotatable sealing ring 19 which is non-rotatably mounted on the shaft 12. Ring 19 normally rotates in the direction of the arrow (FIG. 2). The sealing ring 16 is located within cavity 21 of housing 11 and held substantially concentric to rotatable sealing ring 19. Between housing 11 and the sealing ring 16 is a conventional anti-rotation device (not shown) for preventing rotation of ring 16, as well as a plurality of springs 22 spaced equidistantly around the cavity 21. Springs 22 urge the sealing ring 16 toward engagement with the sealing ring 19. An O-ring 23 seals the space between the sealing ring 16 and the housing 11. The sealing ring 23 is retained in the axial position by a sleeve 24 which is concentric with and locked on the shaft 12, such as by locknut 25 threaded on shaft 12 as shown. O-ring seal 26 precludes leakage between the sealing ring 19 and the shaft 12.

The radially extending face 18 of the sealing ring 19 and radially extending face 17 of sealing ring 16 are in sealing relationship, and define an annular contact area 27 therebetween, this being the seal interface. This seal interface 27 is defined by a surrounding outer diameter 28 of ring 19 and an inner diameter 29 of ring 16, these being the diameters exposed to the high and low pressure fluid respectively in the illustrated embodiment. In operation, a very narrow clearance is maintained between the seal faces 17–18, due to a fluid film as generated by a groove pattern (as described below) formed in the sealing face 18 of the sealing ring 19. Alternately, the groove pattern can be formed in the sealing face 17 of the sealing ring 16 and still be effective. Said narrow clearance is maintained by the fluid between the seal faces which prevents generation of friction heat and wear, but the narrow clearance limits outflow of the sealed fluid from the space 13 into the region 14.

Referring now to FIG. 2, there is illustrated the sealing face 18 of the sealing ring 19, which face has a groove arrangement 31 formed therein. This groove arrangement 31 is of such geometry that there is a gradual shift in the mix of its hydrodynamic and hydrostatic properties as the fluid passes over the groove arrangement 31 on the way from the interface diameter 28 towards interface diameter 29. More specifically, the portion 32 of the groove arrangement 31 will have a higher share of hydrodynamic effect and will be positioned primarily on the radially outer portion of the face 18. This portion 32 normally provides both hydrodynamic and hydrostatic force in the seal interface 27, although it is the primary source for generating hydrodynamic force and hence will herein normally be referred to as the hydrodynamic region.

The groove arrangement 31 also includes a second groove portion 33 which is disposed generally radially inwardly of the groove portion 32 and is positioned generally within the center radial region of the face 18, that is the region which is spaced radially from both of the interface diameters 28 and 29. This latter groove portion or region 33 functions primarily to provide a hydrostatic force between the opposed seal faces 17–18 at conditions of near zero rotational speeds. The groove portions 32 and 33 may be formed in the face 18 using conventional fabrications techniques.

Considering first the hydrodynamic groove portion 32, it is defined by a plurality of angled grooves 34 which are formed in the face 18 in substantially uniformly angularly spaced relationship therearound. These grooves 34 are all angled such that they open radially inwardly from the outer diameter 28 in such fashion that the grooves simultaneously project circumferentially and radially inwardly, and have an angled relationship with respect to both the circumferential and radial directions of the seal face. The angled groove 34, as represented by the centerline 36 thereof where the groove intersects the outer diameter 28, normally opens inwardly of the outer diameter 28 at an acute angle relative to a tangent to the outer diameter, which acute angle may be in the neighborhood of 15 degrees.

Each angled groove 34 is defined by a pair of side or edge walls 37 and 38. These walls 37 and 38 angle radially inwardly so as to terminate at a radius designated R4 as generated about the center point O of the face ring, this radius R4 defining the inner diameter for the grooves 34. The opposed side walls 37–38 defining each of the grooves 34 generally and preferably slightly converge relative to one another as the groove angles radially inwardly. These side walls 37–38 may assume different configurations including straight lines, circular arcs or spiral profiles. When the sides 37–38 are defined as circular arcs or spirals, then the side wall 37 is of a convex configuration, and the opposed wall 38 is of a concave configuration.

In the illustrated and preferred embodiment, the opposed sides 37–38 are of circular configuration, but are preferably generated about different radii having different centerpoints.

For example, and referring to FIG. 3, the concave side 38' of groove 34' is generated about a first radius having a first centerpoint C1, and the convex side 37 of the adjacent groove 34 is generated about a second radius which is also swung about the first centerpoint C1, whereby the second radius exceeds the first radius by the perpendicular distance which separates the edges 37 and 38' of the adjacent pair of grooves 34 and 34'. This results in the flat or land 41 as defined between the edges 37 and 38' being of constant transverse width as the land angles radially inwardly toward the center of the ring.

In similar fashion, the concave edge 38 of groove 34 is also generated about said first radius, which first radius is now generated about a second centerpoint C2 spaced from the first centerpoint C1, and similarly the convex edge 37" of the next groove 34" is generated about said second radius which is also swung about the second centerpoint C2, whereby the land 41 between the edges 38 and 37" again has the same constant transverse dimension therebetween as this land angles inwardly toward the center of the ring. The two centerpoints themselves are located on a circle which is concentric about the center 0, and all of the grooves 34 are generated in a similar fashion.

Each of the grooves 34 is of an average depth which is substantially deeper than that of the groove portion 33, which depth is illustrated by the generally flat but preferably tapered (i.e. angled) bottom wall 39 of the groove 34 as illustrated by FIG. 4. More specifically, the groove 34 is preferably of a tapered configuration throughout its length so that the depth varies throughout the groove length, with the groove having its maximum depth at the radially outer end and its minimum depth at the radially inner end as defined at radius R3, although the depth at this radially inner end is still measurable. The average depth of the groove 34 occurs substantially midway throughout the length thereof. In this tapered groove, the groove depth at the radially outer end may be sufficiently deep as to minimize the hydrodynamic force effect if this is desirable to prevent development of taper face distortions at high speeds of rotation. This hydrodynamic force is then more pronounced further inward towards the central radial portion of the groove 34, and becomes again less effective at the shallow end of the groove. Alternatively the depth of the grooves at the radially outer end may be such that the hydrodynamic effect there is the highest.

Considering now the hydrostatic groove portion 33, this groove portion is disposed generally radially inwardly of the hydrodynamic groove portion 32 and is generally of significantly shallower depth so as to cause it to have significantly decreasing hydrodynamic effect. This largely hydrostatic groove portion 33 is terminated by a shallow annular groove 44 which is formed in the seal face 18 in concentric relationship to the centerpoint O. This annular groove 44 is positioned radially inwardly of the angled grooves 34 and is defined between an inner annular wall 46 and an outer annular wall 47. This inner annular wall 46 is effectively defined by the radius R3, and defines the outer diameter of an annular flat land 51, the latter being defined between the low pressure or interface diameter 29 (i.e., radius R2) and the groove wall diameter 46 (i.e., radius R3). The annular land 51 is free of grooves and functions as a dam to significantly restrict flow of sealing fluid thereacross into the lower pressure region defined at the diameter 29.

The annular groove 44 is in continuous and direct fluid communication with the radially inner end of each angled groove 34, and provides a continuous connection and fluid communication between the radial inner ends of the series of angled grooves 34. Each of the angled grooves 34 thus has the radially inner end thereof opening through the outer groove wall 47 for direct and continuous communication with the annular groove 44. In fact, the opposed side edges 37–38 which cooperate to define each groove 34 therebetween themselves terminate directly at this outer groove wall 47.

Figure 6:
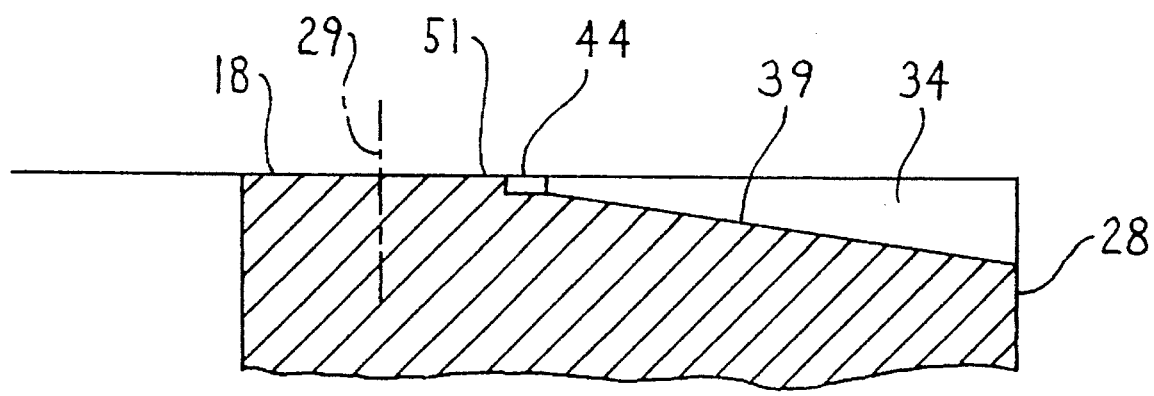
FIG. 6 is a sectional view similar to FIG. 4 but illustrating a variation thereof.

The angled or tapered bottom wall 39 associated with each angled groove 34 is sloped so that the depth of groove 34 progressively decreases as the groove projects inwardly until intersecting the outer groove wall 47. In the illustrated embodiment, as shown in FIG. 4, the bottom wall 48 of the shallow annular groove 44 itself may be angled or tapered as the bottom wall extends radially from the outer wall 47 to the inner wall 46, with the taper of the groove bottom wall 48 constituting an extension of the tapered bottom wall 39 of the groove 34. Alternatively, however, the groove 44 can be of uniform depth in cross section, such being indicated in FIG. 6, with the uniform depth of the groove 44 being selected so as to substantially equal the shallow end depth of groove 39 where the latter intersects the outer groove wall 47.

The groove 44 is preferably of rather narrow radial width which, as defined between the boundary walls 46 and 47, is typically in the neighborhood of about 1/16 inch or less.

As to the depth of the grooves 34 and 44, the grooves 34 have an average depth which is several times greater than the average depth of the annular groove 44, and in fact the average depth of groove 34 is preferably in the range of about five to about ten times the depth of annular groove 44.

More specifically, the angled grooves 34 will normally have an average depth of from about 0.0001 inch to about 0.001 inch, although a more practical maximum depth is believed to be about 0.0005 inch, with a depth of from about 0.0001 inch to about 0.0003 inch being preferred. The shallow annular groove 44 will normally have a depth of from about 0.00001 inch to about 0.00008 inch, with a depth of about 0.00002 inch to about 0.00005 inch being preferred. The depth of groove 44, which is preferably uniform circumferentially thereof, substantially corresponds to the depth of the grooves 34 at the radially inner ends thereof.

As to the radial positional relationships between the grooves 34 and 44, and the land 51, these relationships are determined relative to the radial width ΔR of the seal interface 27 as measured between the high pressure radius 28 (radius R1) and the low pressure radius 29 (radius R2). The land 51 will normally occupy about the radially inner one-fourth to one-third of the distance ΔR, and the groove pattern 31 will normally occupy the radially outer remainder of the radial dimension ΔR. The shallow annular groove 44 is positioned radially so as to be disposed preferably within the middle one-third to about the middle one-half of the width ΔR so as to optimize the fluid pressures in this central region of the face ring to thus provide increased resistance against the conventional distortion which normally occurs at conditions at or near zero speed of rotation.

In operation at low or zero speed, the high pressure fluid surrounding the outer diameter 28 enters into the deep grooves 34 and the shallow groove 44, but is then restricted from further radial inward flow by the land or dam 51. This pressure fluid within the grooves creates sufficient hydrostatic pressure to effect a small separation between the opposed seal faces 17–18 throughout the interface area 27, there thus being created a hydrostatic force in the small gap between the opposed seal faces. This hydrostatic force is particularly desirable since a substantially uniform force is created annularly around the entire central radial region of the seal interface 27 due to the presence of the shallow annular groove 44, whereby a uniform pressure and hence gap is created between the opposed seal faces 17–18. This eliminates or greatly minimizes the tendency of the seal face to distort circumferentially into a wavy pattern. A small but controlled amount of the sealing fluid will pass over the dam or land 51 to the low pressure side 29 of the seal, but the presence of the annular pressure groove 44 results in the land 51 being of uniform radial extent circumferentially therearound, whereby the pressure gradients of the fluid passing over the land 51 are also circumferentially uniform to minimize any tendency for the seal face to distort circumferentially. The presence of this hydrostatic force greatly minimizes frictional contact between the opposed sealing faces 17–18, and greatly facilitates start-up of the seal both by reducing the stresses imposed on structural elements that transmit the seal face friction to the seal housing 11 or the rotating shaft 12, and by significantly reducing or eliminating direct frictional contact between the opposed relatively rotatably seal faces 17–18 as rotation is initiated.

As the seal arrangement operates at higher rotational speed, the high pressure fluid in the hydrodynamic groove portion 30 is effectively pumped out over the lands 41 to create and increase the dimension of the gap or clearance between the opposed faces 17–18 so as to permit relative high speed rotation between the seal faces while effectively avoiding or greatly minimizing any direct frictional contact therebetween. The fluid pressure profile (i.e. hydrodynamic force) created between these opposed seal faces 17–18 under this later condition, however, is subject to its highest pressure at a location spaced radially outwardly a small distance from the groove wall 47 with this highest pressure region extending outwardly of the grooves 34 into at least the central portion of grooves 34 longitudinally between the ends of the respective angled grooves. Due to the convergence in the depth of the grooves 34 as they project radially inwardly, the fluid in the grooves under conditions of high speed rotation is generally pumped radially inwardly toward the annular groove 44. However, the minimal depth of the angled grooves 34 where they join directly to the annular groove 44 is so shallow as to prevent any effective hydrodynamic pressure from being generated in the vicinity of the shallow inner ends of the grooves 34. Radially outwardly from the inner ends, however, in the longitudinally-disposed central or outer region of the grooves 34, the depth of the grooves is such as to permit effective generation of hydrodynamic pressure, with the hydrodynamic pressure profile then decreasing adjacent the outer ends of the grooves 34 if the depths at the outer ends are too large for creating effective hydrodynamic pressure or because sealed pressure effect will override. The highest hydrodynamic pressures are thus generally created in the central regions of the angled grooves 34, which central regions are centered approximately one-third of the seal interface dimension $\Delta R$ from the outer high pressure diameter 28. For this pressure fluid to escape to the lower pressure side 29 of the seal, it must first flow over the shallow groove region 33 which creates significant flow resistance, and in addition must also flow across the relatively wide dam or land 51. This thus severely impedes the escape of the sealing fluid to the low pressure side of the device, and permits the development of a desirable hydrodynamic force while at the same time provides for controlled and acceptable rates of sealing fluid leakage to the low pressure side.

When the hydrostatic groove portion 33 is defined at its inner end by the shallow annular groove 44, this effectively equalizes pressures circumferentially in the vicinity of annular groove 44. Thus, the fluid pressure fields created between adjacent angled grooves 34 in the presence of the lands 41 can be maintained at a substantially uniform magnitude circumferentially. Since the pressure fluid occupies not only the grooves 34 but also the annular groove 44, this minimizes distortions of both sealing faces in circumferential directions and permits therefore smaller hydrostatic face separation with smaller leakage while avoiding or minimizing face contact when at or near zero rotational speed.

Since the high pressure fluid exists continuously throughout the annular groove 44 in a hydrostatic condition, the pressure drop of the fluid as it escapes radially across the land 51 to the low pressure side 29 creates uniform pressure gradients which extend circumferentially of the seal ring, thereby also minimizing distortion circumferentially of the seal ring in the area of the land 51, and hence minimizing the tendency of the seal ring to deform into a wavy circumferentially-extending configuration, as discussed above. However, under a hydrodynamic condition, the shallow groove region 33 effectively acts as an extension of the land 51 to provide for controlled and minimal leakage of sealing fluid thereacross during operation near to or at full speed.

While the invention illustrated and described herein has the high pressure region located at the outer diameter, which is the most commonly encountered use condition, it will be appreciated that the groove pattern can extend radially from an inner diameter if the latter is the high pressure region.

An alternate embodiment of the invention will now be described with reference to FIGS. 7–10. In the embodiment, the same reference numbers are used to designate corresponding parts of FIGS. 2–6 except the numbers are increased by "100".

Figure 7:
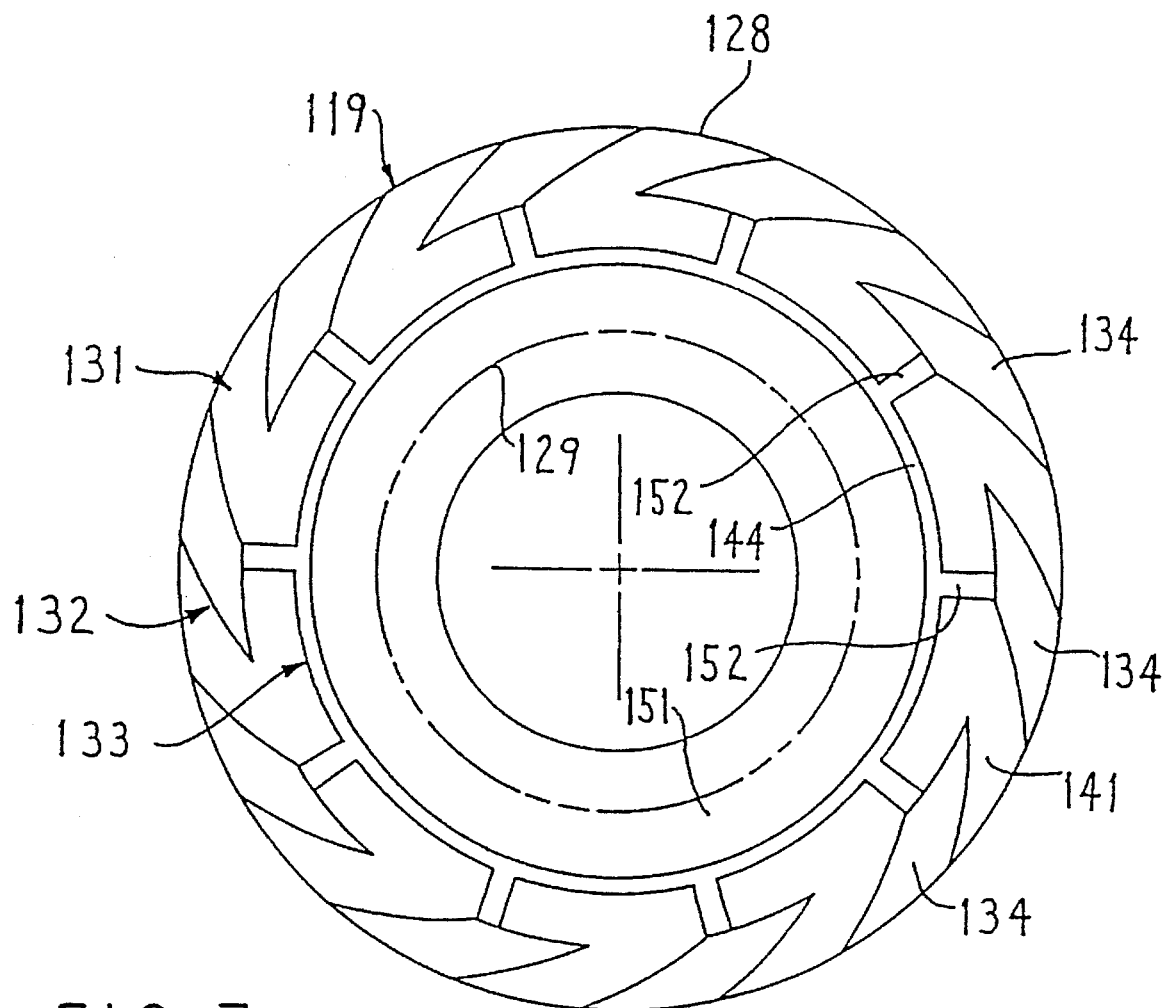
FIG. 7 is a view also taken generally along line 2—2 in FIG. 1 and illustrating the groove pattern associated with a face of the rotating seal ring according to a second embodiment of this invention.

Referring now to FIG. 7, there is illustrated the sealing face 118 of the sealing ring, which face has a groove arrangement 131 formed therein. This groove arrangement 131 includes a first groove pattern 132 which is positioned primarily on the radially outer portion of the face 118. This groove pattern 132 normally provides both hydrodynamic and hydrostatic force in the seal interface (i.e., interface 27 in FIG. 1), although it is the primary source for generating hydrodynamic force and hence will herein often be referred to as the hydrodynamic region.

The groove arrangement 131 also includes a second groove pattern 133 which is disposed generally radially inwardly of the groove pattern 132 and is positioned generally within the center radial region of the face 118, that is the region which is spaced radially from both of the interface diameters 128 and 129. This latter groove pattern or region 133 functions primarily to provide a hydrostatic force between the opposed seal faces (such as 17–18 in FIG. 1) at conditions of near zero rotational speeds. The groove patterns 132 and 133 may be formed in the face 118 using conventional fabrications techniques.

Considering first the hydrodynamic groove pattern 132, it is defined by a plurality of angled grooves 134 which are formed in the face 118 in substantially uniformly angularly spaced relationship therearound. These grooves 134 are all angled such that they open radially inwardly from the outer diameter 128 in such fashion that the grooves simultaneously project circumferentially and radially inwardly, and have an angled relationship with respect to both the circumferential and radial directions of the seal face. The angled groove 134, as represented by the centerline 136 thereof where the groove intersects the outer diameter 128, normally opens inwardly of the outer diameter 128 at an acute angle relative to a tangent to the outer diameter, which acute angle may be in the neighborhood of 15 degrees.

Each angled groove 134 is defined by a pair of side or edge walls 137 and 138. The inner ends of grooves 134 terminate generally at shoulders or abutments 139 which are generally rather abrupt and are defined about a radius designated R4 as generated about the center point O of the face ring, this radius R4 defining the groove diameter for the grooves 134 of the outer groove pattern 132. The opposed side walls 137–138 defining each of the grooves 134 generally and preferably slightly converge relative to one another as the groove angles radially inwardly. These side walls 137–138 may assume different configurations including straight lines, circular arcs or spiral profiles. When the sides 137–138 are defined as circular arcs or spirals, then the side wall 137 is of a convex configuration, and the opposed wall 138 is of a concave configuration.

In the illustrated and preferred embodiment, the opposed sides 137–138 are of circular configuration, but are preferably generated about different radii having different centerpoints.

For example, and referring to FIG. 8, the concave side 138' of groove 134' is generated about a first radius having a first centerpoint C1, and the convex side 137 of the adjacent groove 134 is generated about a second radius which is also swung about the first centerpoint C1, whereby the second radius exceeds the first radius by the perpendicular distance which separates the edges 137 and 138' of the adjacent pair of grooves 134 and 134'. This results in the flat or land 141 as defined between the edges 137 and 138' being of constant transverse width as the land angles radially inwardly toward the center of the ring.

In similar fashion, the concave edge 138 of groove 134 is also generated about said first radius, which first radius is now generated about a second centerpoint C2 spaced from the first centerpoint C1, and similarly the convex edge 137" of the next groove 134" is generated about said second radius which is also swung about the second centerpoint C2, whereby the land 141 between the edges 138 and 137" again has the same constant transverse dimension therebetween as this land angles inwardly toward the center of the ring. The two centerpoints themselves are located on a circle which is concentric about the center 0, and all of the grooves 134 are generated in a similar fashion.

Each of the grooves 134 is of substantial depth relative to the groove pattern 133, which depth is illustrated by the generally flat bottom wall 142 of the groove 134 as illustrated by FIG. 9. The groove depth in a preferred embodiment is substantially uniform throughout the length of the groove 134.

Figure 9A:
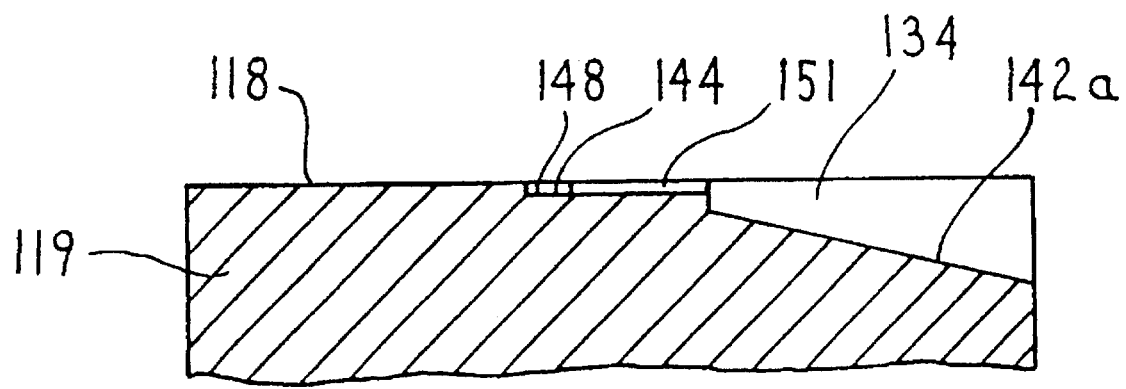
FIGS. 9A and 9B are sectional views similar to FIG. 9 but illustrating a variations thereof.
Figure 9B:
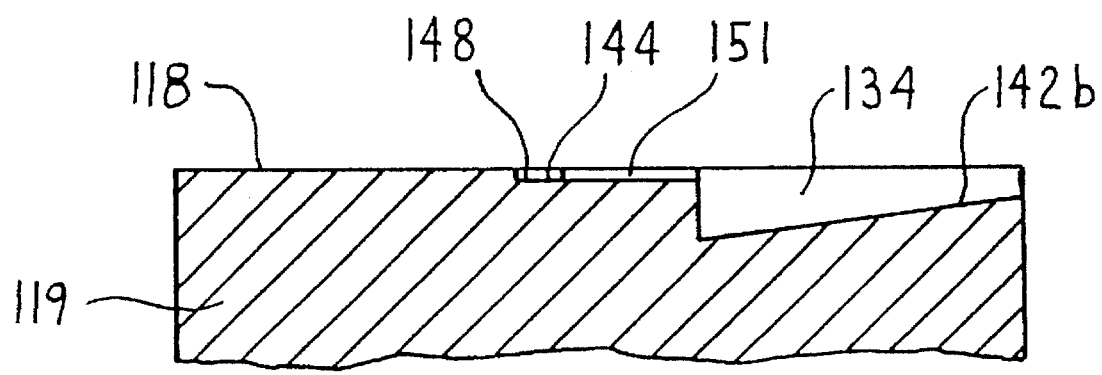

However, the groove 134 can be of a tapered configuration throughout its length so that the depth varies throughout the length, such being diagrammatically illustrated by the variations indicated at 142a and 142b in FIGS. 9A and 9B. As to the groove bottom wall designated at 142a (FIG. 9A), this groove has its maximum depth at the radially outer end, and its minimum depth at the radially inner end, although the depth at the radially inner end is still sufficient so as to result in a significant shoulder or wall 139 at the radially inner end thereof. Further, with this variation designated at 142a, the average depth of the groove substantially midway throughout the length thereof preferably substantially corresponds to the uniform depth of the groove as indicated by the bottom wall 142. In this tapered variation designated at 142a, the groove depth at the radially outer end is sufficiently deep as to minimize the hydrodynamic force effect. This latter effect is more pronounced adjacent the radial inner end of the groove 134 in the region of the face ring which is more centrally located, and is believed more effective for applying greater pressure against the central portion of the face ring so as to resist the typical thermal distortion (i.e. crowning) which occurs in operation.

As to the other tapered variation of the groove 134 as illustrated by the bottom 142b in FIG. 9B, in this variation the groove 134 is shallowest at its radially outer end and deepest at its radially inner end adjacent the shoulder 139.

The shallowness of the groove at the radially outer end is such as to effectively starve this region of the groove of fluid, and again minimizes the hydrodynamic effect in this region so that greater pressure is developed closer to the center of the face ring so as to tend to provide increased pressure resistance against the distortion of the ring which normally occurs during operation.

Considering now the hydrostatic groove pattern 133, this groove pattern is disposed generally radially inwardly of the hydrodynamic groove pattern 132 and is generally of significantly shallower depth so as to prevent it from having any significant hydrodynamic effect. This hydrostatic groove pattern 133 is formed primarily by a shallow annular groove 144 which is formed in the seal face 118 in concentric relationship to the centerpoint O. This annular groove 144 is positioned in radially-inwardly spaced relationship from the inner end walls 139 of the deep grooves 134, with annular groove 144 being defined between an inner annular wall 146 and an outer annular wall 147. This inner annular wall 146 is effectively defined by the radius R3, and defines the outer diameter of an annular flat land 151, the latter being defined between the low pressure or interface diameter 129 (i.e., radius R2) and the groove wall diameter 146 (i.e., radius R3). The annular land 151 is free of grooves and functions as a dam to significantly restrict flow of sealing fluid thereacross into the lower pressure region defined at the diameter 129.

The groove pattern 133, in the preferred and illustrated embodiment, includes a series of shallow communication grooves or passages 152 which extend radially between the annular groove 144 and the radially inner ends of the individual angled deep grooves 134. Each communication passage 152 has a radially inner end thereof connected directly to the annular groove 144, with the communication passage 152 projecting radially outwardly generally along a radial direction so that the outer end of each passage 152 communicates with a radially inner end of a respective one of the deep grooves 134. These communication passages 152 are preferably of shallow depth substantially equal to the shallow depth of the annular groove 144. Passages 152 at their radially outer ends preferably communicate directly through the end wall 139 of the respective angled groove 134, which communication of the passage 152 through the end wall 139 is represented by an abrupt step or shoulder due to the radially inner end of groove 134 being significantly deeper than the depth of the passage 152.

In addition, passage 152 has a width (as measured circumferentially) which is significantly smaller and in fact a small fraction of the length (as measure circumferentially) of the groove end wall 139, which width is preferably no more than about one-fourth the length of end wall 139. Further, passage 152 preferably opens through the groove end wall 139 adjacent one end thereof, particularly adjacent the end thereof which is disposed upstream relative to the flow of pressure fluid into the groove 134, which upstream end of wall 139 is the end thereof which connects to the convex side wall 137. This positional relationship for the communication passage 152, as illustrated by FIG. 9, results in definition of a downstream region 153 as defined effectively at the closed end of the groove 134, which region 153 does not directly communicate with the passage 152 and permits development of significant hydrodynamic pressure during seal operation.

The radially inward spacing of the annular groove 144 from the inner end walls 139, and the presence of the connecting passages 152, results in the defining of pads or lands 154 which project radially inwardly from the lands 141 so as to effectively terminate at the outer groove wall 147, with these lands 154 extending circumferentially between adjacent passages 152. Each land 154 includes a part thereof which is defined radially between the groove wall 147 and the end wall 139, whereby the combined lands 141 and 154 have a generally V-shaped configuration.

The groove 144 is preferably of rather narrow radial width which, as defined between the boundary walls 146 and 147, is typically in the neighborhood of about 1/16 inch or less.

The presence of the lands 154 of significant face area, and their presence generally within the central radial region of the seal face 118, coupled with the fact that the minimum transverse dimension across these lands is relatively large, is effective for trapping fluid therebetween so as to create a thrust bearing effect at times of operation at relatively high speeds of rotation. That is, a squeeze film effect is created at the lands 154 which is effective for resisting changes in gap width due to high speed induced oscillations and vibrations.

As to the depth of the grooves 134 and 144, the grooves 134 have a depth which is several times greater than the depth of the annular groove and which is preferably in the range of about five to about ten times the depth of annular groove 144. More specifically, the deep grooves 134 will normally have an average depth of from about 0.0001 inch to about 0.001 inch although a more practical maximum depth is believed to be about 0.0005 inch with a depth of from about 0.0001 inch to about 0.0003 inch being preferred. The shallow annular groove 144 will normally have a depth of from about 0.00001 inch to about 0.00008 inch with a depth of about 0.00002 inch to about 0.00005 inch being preferred. The depth of groove 144 is preferably uniform circumferentially thereof. Passages 152 preferably have the same depth as groove 144.

As to the radial positional relationships between the deep grooves 134, the shallow grooves 144 and 152, and the land 151, these relationships are determined relative to the radial width ΔR of the seal interface 127 as measured between the high pressure radius 128 (radius R1) and the low pressure radius 129 (radius R2). The hydrodynamic groove pattern 132 will normally occupy about the radially outer one-fourth to one-third of the radial dimension ΔR, the land 151 will normally occupy about the radially inner one-fourth to one-third of the distance ΔR, and the hydrostatic groove pattern 133 will normally occupy the remaining middle part of the radial distance ΔR. The shallow groove pattern 133 can be either radially narrowed or widened as desired so that it will occupy anywhere from the middle one-quarter to about the middle one-half of the width ΔR so as to optimize the fluid pressures in this central region of the face ring so as to provide increased resistance against the conventional distortion and crowning which normally occurs in operation, such as due to thermal effects.

In operation, the high pressure fluid surrounding the outer diameter 128 enters into the deep grooves 134 and the shallow groove 144, but is then restricted from further radial inward flow by the land or dam 151. This pressure fluid within the grooves creates sufficient hydrostatic pressure to effect a significant unloading or a small separation between the opposed seal faces 17–18 (FIG. 1) throughout the interface area 27 (FIG. 1), there thus being created a hydrostatic force between the opposed seal faces. This hydrostatic force is a particularly desirable kind since it is substantially uniform annularly around the entire central radial region of the seal interface due to the presence of the shallow annular groove 144, whereby a uniform pressure unloading or a gap is created between the opposed seal faces 17–18. This eliminates or greatly minimizes the tendency of the seal face to distort circumferentially into a wavy pattern. A small but controlled amount of the sealing fluid will pass over the dam or land 151 to the low pressure side 129 of the seal, but the presence of the annular pressure groove 144 results in the land 151 being of uniform radial extent circumferentially therearound, whereby the pressure gradients of the fluid passing over the land 151 are also circumferentially uniform to minimize any tendency for the seal face to distort circumferentially. The presence of this hydrostatic force greatly minimizes frictional contact between the opposed sealing faces 17–18 (FIG. 1), and greatly facilitates start-up of the seal both by reducing the stresses imposed on structural elements that transmit the seal face friction to the seal housing or the rotating shaft, and by significantly reducing or eliminating direct frictional contact between the opposed relatively rotatable seal faces as rotation is initiated.

As the seal arrangement operates at higher rotational speed, the high pressure fluid in the deep grooves 134 is effectively pumped out over the shallow groove region 133 and the lands 141 to create and increase the dimension of the gap or clearance between the opposed faces 17–18 (FIG. 1) so as to permit relative high speed rotation between the seal faces while effectively avoiding or greatly minimizing any direct frictional contact therebetween. The fluid pressure profile (i.e. hydrodynamic force) created between these opposed seal faces under this later condition, however, is subject to its highest pressure in the vicinity of the end walls 139 disposed circumferentially between the adjacent groove regions 132 and 133. For this pressure fluid to escape to the lower pressure side 129 of the seal, it must first flow over the shallow groove region 133 which creates significant flow resistance, and in addition must also flow across the relatively wide dam or land 151. This significant radial extent as defined by the land 151 and the shallow groove region 133 severely impedes the escape of the sealing fluid to the low pressure side of the device, and permits the development of a desirable hydrodynamic force while at the same time providing for controlled and acceptable rates of sealing fluid leakage to the low pressure side. By positioning the communication passages 152 upstream from the converging closed ends of the deep grooves 134, this results in the regions 153 being more effectively closed to permit creation of a high pressure region which results in significant hydrodynamic pressure being created in the adjacent regions of the lands 141 and 154 for maintaining a desired gap between the seal faces during high speed operating conditions.

When the hydrostatic groove pattern 133 includes the shallow annular groove 144 and the shallow communication groove 152 as shown in FIG. 9, this effectively equalizes pressures circumferentially in the vicinity of film annular groove 144. Thus, the fluid film created between adjacent angled grooves 134 in the presence of the lands 141 and 154 can be maintained at a substantially uniform magnitude circumferentially. Since the pressure fluid occupies not only the grooves 134 but also the annular groove 144, this minimizes distortions of both sealing faces in circumferential directions and permits therefore smaller hydrostatic face separation with smaller leakage while avoiding or minimizing face contact when at or near zero rotational speed.

Since the high pressure fluid exists continuously throughout the annular groove 144 in a hydrostatic condition, the pressure drop of the fluid as it escapes radially across the land 151 to the low pressure side 129 creates uniform pressure gradients which extend circumferentially of the seal ring, thereby also minimizing distortion circumferentially of the seal ring in the area of the land 151, and hence minimizing the tendency of the seal ring to deform into a wavy circumferentially-extending configuration, as discussed above. However, under a hydrodynamic condition, the entire shallow groove region 133 effectively acts as an extension of the land 151 to provide for controlled and minimal leakage of sealing fluid thereacross during operation near to or at full speed.

While the illustrated and preferred embodiment discloses the shallow groove arrangement 133 having the annular groove 144 communicating directly with the deep grooves 134 through the shallow communication passages or grooves 152, it will be appreciated that other alternative communication passages can be provided for permitting the shallow annular groove 144 to communicate with the high pressure fluid surrounding the seal. For example, several bores can be provided so as to communicate with the high pressure diameter 128 and then project radially inwardly of the seal ring in rearwardly spaced relation from the seal face 118, with these radial bores at radially inner ends being communicated solely with axial bores which provide communication solely between the radial bores and the bottom of the groove 144. Preferably several such axial bores would be provided at circumferentially spaced locations around the annular groove 144. With such arrangement, the surrounding high pressure fluid will communicate directly with the annular groove 144 at the same time it communicates with the deep grooves 134, in which case the communication grooves 152 can be eliminated. Variations of this latter described type, however, must be recognized as being significantly more expensive to manufacture, and are felt to possess less reliability than the use of surface communication passages such as the passages 152.

While the invention illustrated and described herein has the high pressure region located at the outer diameter, which is the most commonly encountered use condition, it will be appreciated that the groove pattern can extend radially from an inner diameter if the latter is the high pressure region.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fluid seal device cooperating between a housing and a rotatable shaft for creating a fluid seal between high and low pressure regions, said device comprising:

a first seal ring mounted on the shaft for rotation therewith and a second seal ring disposed adjacent the first seal ring and being nonrotatably mounted relative to the housing;

said first and second seal rings respectively defining thereon opposed first and second flat annular seal faces adapted to substantially axially abut to define an annular seal interface which extends radially therebetween and is defined by radially spaced high and low pressure diameters which respectively communicate with said high and low pressure regions, one of said seal rings being axially movable and normally urged axially toward the other seal ring;

a groove pattern formed in one of said seal faces and communicating with the high pressure region for causing a thin film of pressurized fluid to be interposed between said seal faces to create a small clearance therebetween;

said groove pattern including first groove means formed in said one seal face for creating a hydrodynamic fluid seal between the opposed seal faces when the first and second seal rings relatively rotate, said first groove means being disposed adjacent the high pressure diameter of said seal interface;

said groove pattern including second groove means formed in said one seal face for creating a hydrostatic fluid seal between said opposed seal faces when said first and second seal faces are substantially stationary, said second groove means being disposed radially from said first groove means;

said one seal face defining thereon an annular non-grooved flat land extending radially between said low pressure diameter and said second groove means;

said first groove means includes a plurality of first grooves disposed in generally uniformly angularly spaced relationship around said one seal face, said first grooves being angled to project circumferentially and radially from said high pressure diameter, said first grooves terminating at inner ends;

said second groove means including a shallow annular groove formed in said one seal face in concentric relationship to the respective seal ring, said shallow annular groove being disposed radially of but directly adjacent said inner ends of said first grooves, said shallow annular groove being disposed in direct and open fluid communication with and circumferentially connecting the inner ends of said first grooves, and said shallow annular groove defining a radial boundary of said annular land; and said first grooves having an average depth which is several times greater than the depth of said annular groove.

2. A seal device according to claim 1, wherein the inner ends of said first grooves terminate directly at and open through a radial boundary wall of said annular groove.

3. A seal device according to claim 2, wherein said first grooves have a depth which progressively decreases as the first grooves project from the high pressure diameter to the radial boundary wall of said annular groove.

4. A seal device according to claim 3, wherein the first grooves adjacent the inner ends thereof have a depth which substantially equals the depth of the shallow annular groove.

5. A seal device according to claim 1, wherein the first groove has an average depth in the range of about 0.0001 inch to about 0.001 inch, and wherein the depth of said first groove is in the range of about five to about ten times the depth of the shallow annular groove.

6. A seal device according to claim 1, wherein said shallow annular groove has a depth in the range of about 0.00001 inch to about 0.00008 inch and wherein said first grooves have an average depth which is at least several times greater than the depth of said annular groove.

7. A seal device according to any one of claims 1–6, wherein the sealing fluid is a gas.

* * * * *